3,432,157
APPARATUS FOR REFINING METALS
Howard Knox Worner, New Lambton, New South Wales, Australia, assignor to Conzinc Riotinto of Australia Limited, Melbourne, Victoria, Australia
Original application Aug. 17, 1964, Ser. No. 390,042, now Patent No. 3,226,672, dated Dec. 28, 1965. Divided and this application Nov. 8, 1966, Ser. No. 620,568
U.S. Cl. 266—35      17 Claims
Int. Cl. C21c 5/42

ABSTRACT OF THE DISCLOSURE

This disclosure teaches an apparatus for refining metals which includes a furnace having a refining chamber with a metal inlet and a metal outlet, a slag separation chamber communicating with the refining chamber and having a slag outlet, and means for injecting oxygen containing gas into the metal in the refining chamber. The arrangement of the refining chamber and slag separation chamber is such as to permit slag to flow from the refining chamber into the slag separation chamber with some of the slag flowing countercurrent to the flow of metal in the refining chamber and to permit metal which separates from the slag in the slag separation chamber to return to the refining chamber.

---

This is a division of application Ser. No. 390,042, filed Aug. 17, 1964, now Patent No. 3,226,672, issued Dec. 28, 1965.

This invention relates to improvements in apparatus for continuously or semi-continuously refining crude metals or alloys or mattes to metals, in which the oxidation of unwanted substances is achieved by reactions involving oxygen, or oxygen-containing gas. The invention is concerned particularly with apparatus in which the said oxidation is achieved by blowing or feeding an oxygen-containing gas into or onto a slowly flowing stream of molten crude metal or matte, through a succession of lances or tuyeres disposed along the path of flow of the molten material. It applies, for example, to the continuous refining of molten pig iron to steel and to the continuous conversion of copper or nickel mattes to copper and nickel respectively. In this specification the term "metal" includes crude metals, alloys and mattes, and each of the terms "oxygen" and "oxygen-containing gas" includes oxygen, air and other suitable oxygen-containing gases.

It is an object of this invention to achieve higher refining efficiency than is obtained with other known refining processes.

In earlier attempts at continuous refining or molten crude metals or mattes the slag has been removed directly through a taphole in the wall of the main refining chamber. With this arrangement and practice it is not easy to achieve low metal or matte losses in the outgoing slag. The principal contributing factors to this carryover of metal or matte, mainly in the form of fine prills or beads, are:

(i) The vigorous stirring of metal and slag or of matte and slag, as the case may be, induced by nearby injection of the oxidising gas and/or by the liberation of gases in the metal or matte resulting from the oxidation reactions.

(ii) In cases where the taphole was located near to the crude metal or matte entry end, the more viscous nature of the slag in this cooler region.

The furnace designs covered by this present invention aim to reduce considerably the carryover of metal or matte prills while at the same time achieving high refining efficiency.

The invention in one general form is apparatus for refining metals which comprises a furnace having an elongated refining chamber, an inlet through which unrefined metal is admitted to the refining chamber, the metal being caused to flow slowly through the refining chamber, an outlet through which refined metal is discharged from the refining chamber, means for introducing oxygen into or onto the metal at a succession of points during its flow through the refining chamber, means for introducing fluxing materials into the refining chamber, a slag settling chamber communicating with the refining chamber, slag being caused to flow from the refining chamber into the slag settling chamber, and a slag outlet in the slag settling chamber.

In the case of elements like carbon or sulphur the products of oxidation are mostly gaseous, for example, carbon monoxide or sulphur dioxide, and these gases bubble out of the bath to enter the gas exit stream. Most of the other products of oxidation need fluxing to enable them to enter the slag phase, and in this invention it is envisaged that the fluxing additions will be made at appropriate points along the length of flow of the metal, preferably including additions near the metal outflow end of the furnace, and that the slag formed will flow countercurrent to the metal in order to pass out of the slag settling chamber at some position remote from the metal taphole. In some forms of the invention both concurrent slag flow and countercurrent slag flow relative to metal are achieved.

In this present invention, the fluxing additions may be made either through lances or tuyeres or through separate ports in the furnace roof or walls.

The term "lance" in this specification includes a tube having one or more discharge outlets through which an oxygen-containing gas, such as air, oxygen, or oxygen enriched air and/or gaseous liquid or particulate solid fuel and/or fluxes or other additives are injected or fed into the furnace. The lance may or may not be fluid cooled.

The refractories used to line the furnace are appropriate to the reactants used and to the products formed in the furnace and to the temperature and other conditions existing in the furnace, for example in the refining of molten pig iron, high quality basic refractories rich in magnesium oxide are appropriate. In the refining of copper or nickel mattes, dense chrome-magnesite refractories are suitable. Alternatively in certain zones of the furnace, fluid cooled jackets may be used to form the walls and/or roof of the furnace.

The slag settling chamber preferably comprises a branch of the furnace which communicates with the refining chamber, either at or near the metal inlet or at a point intermediate between the metal inlet and the metal outlet, and the said slag branch may be disposed in line with, at right angles to or parallel to, the refining chamber, the furnace design being thus linear, L-shaped, U-shaped, T-shaped or of other appropriate shape when viewed in plan.

The slag outlet is suitably arranged at or near the end of the slag settling branch remote from the junction of said branch with the refining chamber, and said outlet may comprise a taphole, overflow lip or other approved discharge means.

The floor of the slag settling branch preferably slopes upwards from the region of the junction with the refining chamber towards the slag outlet, so that metal which enters the slag branch or which settles out from the slag in the slag branch flows back into the refining branch. The level of the floor of the slag branch at the entry end of the said branch is preferably located at or near the intended level of the metal in the refining chamber, and the slag outlet is preferably located above the intended level of the metal and just below the slag level.

A slag wall or barrier is provided in the refining chamber at or near the metal outlet.

A gas offtake or outlet is provided in the furnace for removal of exit gases, and is preferably located in the slag settling branch at or near the slag outlet to ensure flow of gases concurrently with the slag from the refining chamber towards the slag outlet.

The unrefined metal is fed continuously or semi-continuously to the inlet of the refining branch, the refined metal is tapped continuously or semi-continuously from the metal outlet, and slag is discharged continuously, semi-continuously or intermittently from the slag outlet.

In a further form of the invention simultaneous concurrent slag flow and countercurrent slag flow are achieved by employing a T-shaped furnace having a slag branch which extends preferably at right angles to the refining chamber and is joined with said chamber at a point intermediate between the metal inlet and the metal outlet, for example, at a point about midway between said inlet and outlet. Slag is withdrawn from the end of the slag branch remote from the junction thereof with the refining chamber. The floor of the slag branch slopes upwardly towards the slag outlet and for most or all of its length is above the level of the metal in the refining chamber.

In an alternative arrangement, the slag branch is disposed linearly relative to the refining chamber, that is, it extends substantially in line with the elongated refining chamber and communicates therewith at the entry or inlet end thereof. In another arrangement the slag branch is disposed substantially at right angles to the refining chamber and communicates with said chamber at or near its inlet end, thereby forming a substantially L-shaped furnace. In a still further arrangement the refining chamber and slag branch are arranged substantially parallel to one another and are connected by a common inlet section.

In all forms of the invention the provision of a raised and sloping floor in the slag branch or section of the furnace ensures that (a) little stirring action can take place between metal and slag because there is little reacting underlying metal in the slag branch or section, and (b) the beads or prills of metal which settle out from the slag in the slag branch are caused to gravitate back to the main refining chamber or section of the furnace.

Other features and variations of the invention will become apparent from the ensuing description of the forms of the invention illustrated in the accompanying drawings, wherein.

Figure 2:
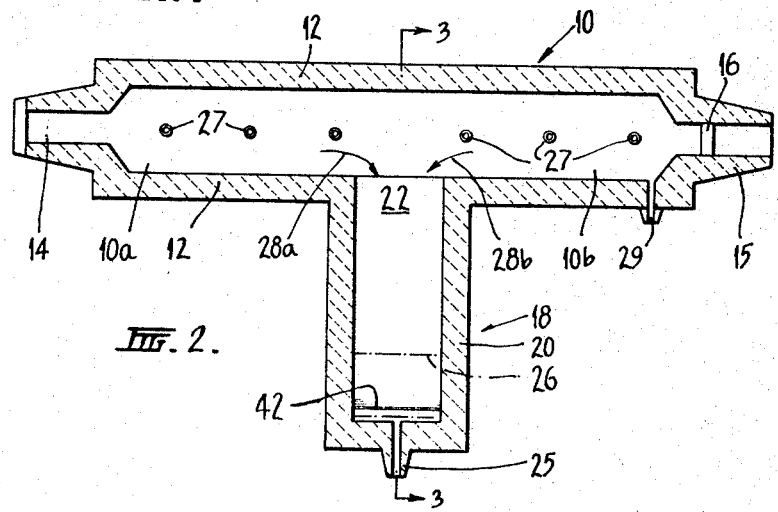
FIGURE 2 is a view in sectional plan of the furnace shown in FIGURE 1.
Figure 3:
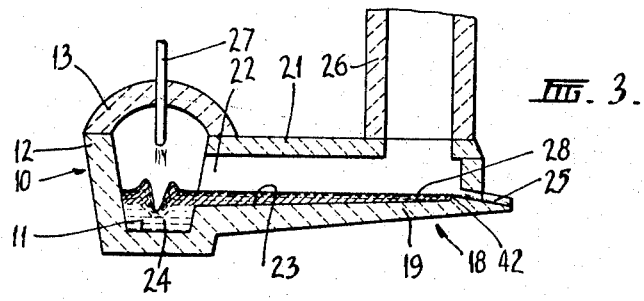
Figure 4:
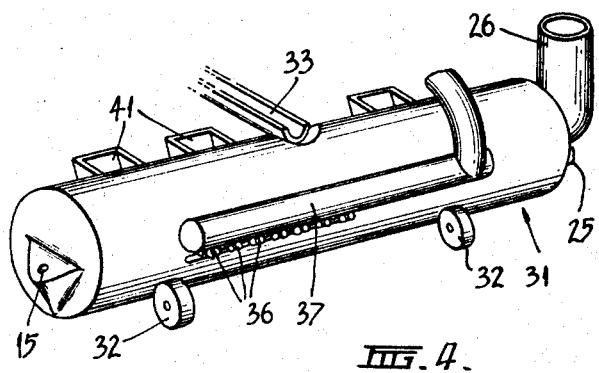
Figure 5:
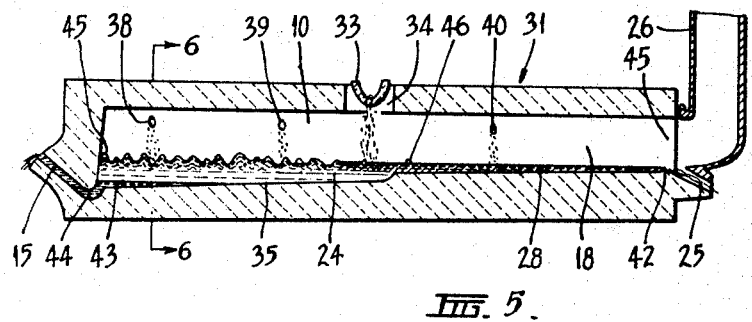
Figure 6:
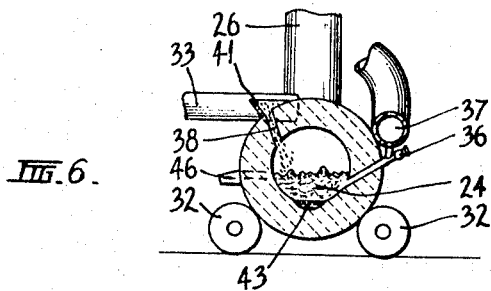
Figure 7:
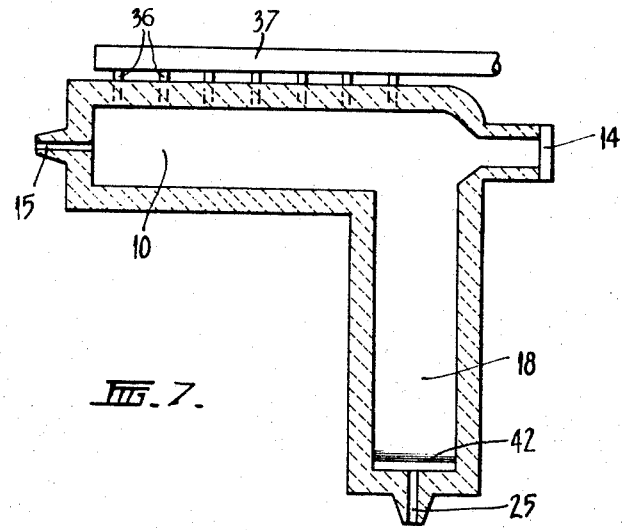
Figure 8:
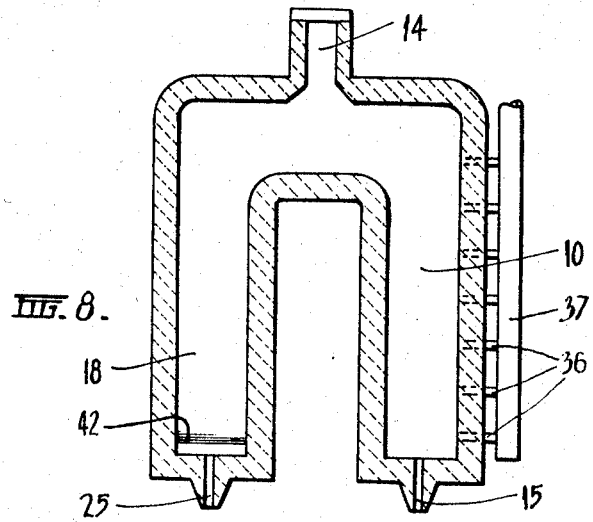

FIGURE 3 is a view in sectional transverse elevation taken on the line 3—3 of FIGURE 2, FIGURE 4 is a semi-isometric view of a linear furnace, FIGURE 5 is a view in sectional longitudinal elevation of the furnace shown in FIGURE 4, FIGURE 6 is a view in sectional end elevation taken on the line 6—6 of FIGURE 5, FIGURE 7 is a view in sectional plan of an L-shaped furnace, and FIGURE 8 is a view in sectional plan of a U-shaped furnace.

Figure 1:
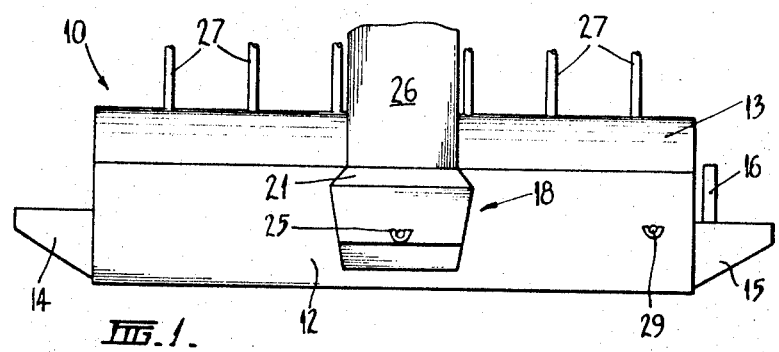
FIGURE 1 is a view in longitudinal elevation of a T-shaped furnace.

Referring to the drawings, in which the same references are used to indicate like or corresponding parts or features, and with particular reference to FIGURES 1, 2 and 3, the main refining chamber 10 has a refractory floor 11, side walls 12 and arched roof 13, and a metal or matte entry or inlet 14 and a metal outlet 15. A slag barrier 16 is provided ahead of or near to the metal outlet 15.

A slag branch 18 having a floor 19, side walls 20 and roof 21 is connected at its inner or entry end 22 to the main refining chamber 10. The upper surface 23 of the floor of slag branch 18 slopes upwardly from at or near the expected level of the metal or matte 24 in the chamber 10 to above that level at the slag outlet 25. An auxiliary slag outlet 29 for testing purposes, may be provided. The slag branch 18 connects with the refining chamber 10 at about its centre and between the sections 10a and 10b of said chamber 10.

A gas off-take 26 is provided, either (as shown) through the roof 21 of the slag branch 18, or (not shown) through the end wall of the said branch 18. In some applications (not shown) the gas outlet may be located in the roof or walls of the refining chamber 10.

An oxygen-containing gas is introduced under pressure through lances 27 at successive points or intervals along the length of the main refining chamber 10. Alternatively, the oxygen-containing gas may be introduced through tuyeres (not shown) in a side wall 12 of the refining chamber 10. The number and size of the lances 27 or tuyeres are chosen to suit the type of material being treated and the design of the furnace employed. The oxygen-containing gas is injected into or onto the molten metal 24 in the refining chamber 10 and causes turbulence therein.

Fluxes, preferably in particulate form, may be introduced, through the lances 27 or tuyeres, in an entrained state in the oxygen-containing gas, or may be introduced separately through ports or lances (not shown) in the roof or sides of the refining chamber 10. The fluxing material or materials is or are preferably introduced into the refining chamber 10 near to the metal inlet 14 and also near to the metal outlet 15. It would generally be less efficient to add fluxing material near to the centre of the refining chamber 10 and about opposite to the slag branch 18 which is designed to take away the slag 28 to the slag taphole or outlet 25, since if this were done there would be inadequate contact between the fluxing chemicals and the bath containing the elements they are to remove. Another advantage of adding fluxing materials near to the inlet 14 and near to the outlet 15 is that it ensures that there is ample flux to react with the first "impurity" oxides formed, namely $SiO_2$ in the case of pig iron refining and $FeO$ in matte converting, while the flux added near to the metal outlet 15 acts as a scavenger of fluxable impurities. Usually the amount of fluxing material added near the outlet 15 will be considerably less than that added near the inlet 14.

While the T-branched form of furnace shown in FIGURES 1 to 3 is preferred for certain applications, the benefits of a separate slag settling branch 18, with its raised and sloping floor 19, and of sequential jetting of oxygen-containing gases in the refiner branch 10, can be achieved with other arrangements of the principal features. Thus, the slag branch 18 can be disposed so as to become a linear continuation of the refining chamber 10. An example of this form is shown in FIGURES 4, 5 and 6. Other arrangements or relationships of the refining chamber 10 and slag branch 18 are shown in plan in FIGURES 7 and 8.

Referring to FIGURES 4 to 6, there is illustrated therein a linear form of furnace 31 of substantially circular cross-section which is set up on roll supports 32 so that the furnace 31 may be tilted, when desired, either for the purpose of fettling the refractories or to repair a tuyere or to facilitate draining at the end of a furnace campaign. This particular form of furnace has been found to be particularly suitable for continuous conversion of mattes although, with minor modifications, it can also be used for other continuous refining operations, as for example the continuous production of steel from molten pig iron.

The matte or crude metal 24 is fed to the refining chamber 10 via a launder 33 and through the side or top opening 34 in the furnace 31. The matte or crude metal 24 then makes its way slowly along refining chamber 10 towards the metal outlet 15, the floor 35 of the refining chamber 10 being arranged to slope gently towards the said metal outlet 15. The metal 24 during its passage along the refining chamber 10 is vigorously stirred and reacted with successive jets of oxygen-containing gas which are injected from the tuyeres 36, into the matte or crude metal 24 in the bath. The oxygen-containing gas supply to the tuyeres 36 is supplied under pressure from tube 37 and if the gas is hot air this tube is well lagged.

Fluxes may be added, as in other forms of the invention, usually in particulate form, either entrained in the oxygen-containing gas and via the tuyeres 36, or through separate ports as, for example, those shown at 38 and 39 the fluxes being added through hoppers 41 connecting with said ports.

The slag 28 formed along the length of the refining section 10 moves countercurrent to the matte or metal 24 on the surface of the metal 24 and passes into the slag settling section 18 and ultimately passes out of the furnace over the ridge or lip 42 and via taphole 25. Auxiliary slag outlets 45 and 46 may be provided for testing purposes.

The hot gases move generally in the same direction as the slag 28 and leave the furnace via gas off-take 26, which is conveniently located approximately centrally in the end wall of the slag branch 18, the stack position is therefore able to register with the off-take aperture 45a in the furnace 31 at all times, even when the furnace is tilted through an appreciable angle, as may be required occasionally during fettling or a tuyere repair.

In the application of this form of the invention to copper matte conversion it is advantageous to provide a well or sump 43 at the metal outlet end. This provides a reservoir for the metallic copper 44 which is forming continuously by the oxidation reactions with the white matte, $Cu_2S$. The copper 44 is tapped continuously or semi-continuously via the outlet 15. If desired, a small jet (not shown) of oxygen-containing gas may be directed at the copper as it is held or flows out of the outlet 15. This helps to remove much of the residual sulphur which may exist in the copper collected in the well or sump 43. With the same end in view, an oxygen-containing gas may be injected through a refractory tube (not shown) passed down the tapping spout into the well 43.

With continuous matte conversion it is often advantageous to add a little pyrites to the slag branch 18 at a position such as that of the port 40. The pyrites help to "wash out" of the slag 28 very small prills of copper matte which may have been carried into the branch 18 in the slag 28. It also provides an extra source of heat in the slag branch 18 and additional sulphur dioxide. If it is desired to add oxidised ores or concentrates or dried cement copper, these may conveniently and advantageously be added at positions such as 38 or 39 together with silica flux.

In FIGURE 7 the slag branch 18 is more or less at right angles to the refining chamber 10. Matte or crude metal enters at inlet 14 in the corner region of the furnace, refined metal is withdrawn at 15, and slag is tapped at 25.

FIGURE 8 shows another arrangement of the slag branch 18 relative to the refining chamber 10. In this U-shaped furnace in which the slag branch 18 and refining chamber 10 are substantially parallel, the matte or crude metal is conveniently admitted via inlet 14 (e.g. a spout or small furnace branch) at the bend of the U, and refined metal is withdrawn at outlet 15 and slag at outlet 25.

While the furnaces shown in FIGURES 7 and 8 are not readily tiltable, they have an advantage over the straight line arrangement shown in FIGURES 4 to 6 in that there is less tendency for splashes of matte or metal to be carried into the slag settling branch 18.

In each furnace arrangement, countercurrent flow of slag relative to the metal is achieved, and metal which enters or settles out in the slag branch is returned to the refining chamber, refined metal being withdrawn from the refining chamber and slag being withdrawn from the slag branch. In the furnace arrangement shown in FIGURES 1 to 3, both concurrent flow and countercurrent flow of slag relative to metal are achieved, the former occurring in the section 10a of the chamber 10 and the latter occurring in the section 10b of said chamber, and the slag enters the slag branch 18 from both the section 10a and the section 10b.

Reference will now be made to the application of the invention to the continuous refining to steel of molten pig iron or of semi-steel, from whatever production source, and containing silicon, phosphorus and sulphur as impurities, as well as carbon. The description applies particularly to the T-branched form of furnace shown in FIGURES 1 to 3 but those familiar with the art will readily appreciate how, with minor modifications, the refining can be carried out in other furnace shapes covered by this invention.

The flux additions are either particulate limestone or burnt lime. The limestone or lime added through or close to the lance or lances 27 nearest to the entry end 14 is immediately available to flux the silica formed by the oxidation of the readily oxidisable silicon in the bath metal 24. At the entry end of the refining chamber the slag has the lowest basicity, as measured by the $CaO/SiO_2$ ratio. On the other hand, the limestone or lime added or blown in near to the exit end 15 has little or no silica to flux and so a high basicity is established and maintained. This high basicity is associated with a high degree of oxidation, the slag here containing a significant proportion of ferritic ions. These conditions, combined with the stirring of metal and slag by the jetting action and the gentle carbon "boiling" action (mainly CO evolution), ensures a high refining efficiency with respect to sulphur and phosphorus.

As the slag formed in the section 10b of the furnace flows countercurrent to the steel bath underneath it, its composition progressively changes, giving back to the metal bath much of its iron content but retaining its sulphur and phosphorus. Finally, as indicated by the arrow 28b, it blends with the somewhat lower basicity concurrent-flow slag stream from the section 10a of the furnace (indicated by the arrow 28a) to flow out into the slag branch 18. Until this point, both the concurrent slag stream 28a and the counter-current slag stream 28b have been subjected to active mixing with the metal, because of the aforementioned jetting actions of the oxygen-containing gas and the "boiling" resulting from the liberation of carbon monoxide from the progressively refined metal bath. Once the slag streams enter the slag branch 18, however, this vigorous stirring action substantially ceases, because, as has previously been explained, the floor level 23 of the branch 18 is at or above the level of the metal 24 in the main refining chamber 10. These more quiescent conditions in the slag branch 18 ensures that any prills or beads of metal carried in the slag 28 will have opportunity to settle down to the floor of branch 18 and as the said floor is sloped gently towards the refining chamber 10, such metal rejoins the metal in the main bath.

It is, of course, necessary to maintain an appropriate temperature in the slag 28 within the slag branch 18. The location of the gas off-take 26 towards the end of the branch 18 contributes materially to that end. The hot carbon monoxide-rich gases leaving the main refining chamber 10 radiate heat down onto the slag surface. If it should prove necessary to increase the temperature of these exit gases over the slag branch 18 a little oxygen can be injected through a turbulent jet through a small port (not shown) at a point in the branch 18, preferably near to the main refining chamber 10. This auxiliary oxygen leads to combustion of some of the carbon monoxide in the outgoing gases and gives a corresponding rise in temperature.

The location of the gas off-take 26 in or on the branch 18 rather than in the roof of the main refining chamber 10 also simplifies the roof design of the latter and permits freer access by crane to the whole length of the roof in the refining chamber 10. This is of importance when it is desired to make rapid replacement of a burnt-out section of the roof or to effect other repairs to the top of the furnace.

In the application to matte refining it is highly desirable that the oxidation conditions in the refining branch be controlled so that the iron passes mostly into the ferrous condition, FeO, and thence to the slag as $2FeO.SiO_2$, or its equivalent, rather than to magnetite, $Fe_3O_4$. Magnetite is not readily fluxed by silica at normal operating temperatures. Should magnetite form to an undesirable degree and build up on the walls or end baffles, the accretions can usually be removed by raising the temperature locally and particularly by firing, via a lance, a mixture of pyrites concentrates and sand at the accreted region. As the exothermic oxidation of pyrite raises the temperature, above 1280° C., a reaction of the type:

$$3Fe_3O_4 + FeS + 5SiO_2 \rightarrow 5(2FeO.SiO_2) + SO_2$$

sets in and takes the iron oxide into solution in the slag. The necessary localized rise in temperature can also be achieved by lancing with on oxy-fuel burner.

In the refining of nickel-iron sulphides, difficulties may develop if the conditions in the outlet end of the refining chamber are allowed to become too quiescent and oxidising. This is because of the tendency to form refractory layers of nickel oxide and nickel. These tend to retard or even stop further refining action. These difficulties can be avoided by (a) ensuring that vigorous turbulence is maintained in the refining zone, as by jetting with gas, and (b) incorporating a little fine coal or other hydrocarbon with the oxygen-containing gas blown into the final refining zone. It will be appreciated that nickel, having a much higher melting point than copper, must be produced at temperatures 300–400° C. higher than those of the reactions necessary to refine copper matte to blister copper. It will also be appreciated that this invention is applicable to the conversion of mixed sulphide mattes, as for example copper-nickel mattes, to produce alloys, for example cupro-nickels.

In all forms of the invention, the heat in the exit gases may be used for preheating air or other oxygen-containing gas or for steam raising or for other purposes. In the case of continuous matte refining, the exit gases contain a sufficiently high tenor of sulphur dioxide to make them well suited to acid manufacture. In the application to pig iron refining, the exit gases not only carry much sensible heat but may also contain appreciable "chemical" heat in the form of unburnt carbon monoxide, and the combined heat value can be utilized in various ways.

The following examples illustrate the invention.

EXAMPLE 1

Continuous refining of molten pig iron to steel was effected in a furnace similar to that shown in FIGURES 1, 2 and 3. Hot metal at 1290° C.±15° C. and containing 4.1% C, 0.95% Si, 0.76% Mn, 0.12% P, and 0.05% S was fed from an oil-fired tilting ladle at the rate of 4 tons per hour into entry end 14 of the refining chamber 10 and was subjected to successive jetting with 99.5% oxygen from five lances 27. Powdered burnt lime was added via small roof ports near to the first and last lances 27, thus developing both concurrent and countercurrent slag flow over the bath metal. Steel was tapped from outlet 15 at 1590° C.±20° C. and contained 0.35% C, 0.005% Si, 0.12% Mn, 0.012% P and 0.023% S. The slag tapped from the slag branch 18 at outlet 25 had a

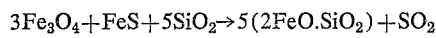

ratio of 1.4 and contained 11% to 13% FeO with less than 0.5% metallic iron in the form of prills.

To illustrate the benefit of the slag branch 18 with its sloping floor and of the practice of concurrent-countercurrent slag flow, some samples of steel and slag were taken when:

(a) Lime was added only at the entry end 14 of the refiner chamber 10 and (b) Slag was tapped through an auxiliary taphole 29 in the furnace wall located just before the taphole 15.

In this case the steel contained 0.39% C, 0.005% Si, 0.18% Mn, 0.06% P and 0.04% S while the slag contained 19% total iron of which between 4% and 6.5% was in the form of prills of steel.

EXAMPLE 2

Continuous conversion of copper matte. Matte of the following composition, Cu 41.2%, Fe 20.1%, S 24.8%, was raised to 1250° C. in an auxiliary oil-fired tilting furnace and poured at a steady rate of 2 tons per hour into the middle entry port 34 of a straight line furnace of the type shown in FIGURES 4 to 6. On refining by jetting with a 50:50 mixture of air and 99.5% oxygen and using silica sand as flux, copper containing 99.0% Cu and 0.85% S was tapped at the outlet spout 15, while the slag tapped at outlet 25, after "settling" in a slag branch 18, five feet long with sloping bottom, contained 0.65% Cu, most of this being in the form of very fine prills of white matte. By contrast, slag tapped from slag branch of the same furnace but from an auxiliary taphole 45 (see FIGURE 5) located in the side wall at a position about 9 inches away from the refiner section 10, contained between 1.8 and 3.6% copper, some of which was in the form of prills visible to the naked eye. Slag tapped from another auxiliary taphole 46 (see FIGURE 5) at the inlet end of the refining chamber 10 contained between 4% and 6% copper.

The addition of a little pyrites to the slag branch 18 at position 40 (see FIGURE 5) lowered the copper in the slag from the outlet 25 to below 0.5%.

I claim:

1. Apparatus for refining metals which comprises a furnace which is substantially T-shaped in plan and which comprises an elongated refining chamber, a metal inlet at one end of the refining chamber through which unfined metal is admitted to the refining chamber, a metal outlet at the other end of the refining chamber through which refined metal is discharged from the refining chamber, the metal being caused to flow slowly through the refining chamber, a series of lances through which oxygen containing gas is introduced into or onto the metal in the refining chamber at successive points therealong, means for introducing fluxing materials into the refining chamber near the metal inlet and near the metal outlet, a slag settling chamber extending substantially at right angles to and communicating with the refining chamber at a point intermediate between the metal inlet and the metal outlet, a slag outlet proximate to the end of the slag settling chamber remote from its junction with the refining chamber, the level of the floor of the slag settling chamber being generally above the level of metal in the refining chamber and the said floor being sloped generally upwardly from the entry end of the slag settling chamber to the slag outlet.

2. Apparatus according to claim 1 wherein the slag settling chamber connects with the refining chamber at a point substantially midway between the metal inlet and the metal outlet.

3. Apparatus according to claim 1 wherein concurrent flow of slag and metal is effected in the part of the refining chamber between the metal inlet and the junction with the slag settling chamber, and countercurrent flow of slag and metal is effected in the part of the refining chamber between the metal outlet and the junction with the slag settling chamber.

4. Apparatus for refining metals which comprises a furnace having a refining chamber; a metal inlet through which unrefined metal is admitted to the refining chamber; a metal outlet through which refined metal is discharged from the refining chamber, metal being caused to flow through the refining chamber from the metal inlet to the metal outlet; means for injecting oxygen-containing gas into the refining chamber; a chamber means for slag separation communicating with the refining chamber and into which slag flows from the refining chamber, the flow of slag in at least a part of the refining chamber being countercurrent ot the flow of metal; means for returning to the refining chamber metal which separates from the slag in the slag separation chamber; and a slag outlet in the slag separation chamber.

5. Apparatus according to claim 4 where in the slag settling chamber is disposed substantially at right angles to the refining chamber.

6. Apparatus according to claim 4 wherein the means for injecting oxygen-containing gas into the refining chamber comprising a series of lances projecting through the furnace.

7. Apparatus according to claim 4 wherein at least one of the lances is disposed at an angle to the surface of the metal in the refining chamber so as to assist the countercurrent flow of slag to metal in at least part of the refining chamber.

8. Apparatus according to claim 4 wherein the slag separation chamber communicates with the refining chamber at a point intermediate between the metal inlet and the metal outlet; and the slag outlet is located proximate to the end of the slag separation chamber remote from its junction with the refining chamber.

9. Apparatus according to claim 4 wherein the level of floor of the slag separation chamber is generally above the intended level of the metal in the refining chamber, and the said floor slopes upwardly from the refining chamber towards the slag outlet.

10. Apparatus according to claim 4 wherein the floor of the refining chamber slopes downwardly towards the metal outlet.

11. Apparatus according to claim 10 and having a metal reservoir or sump between the refining chamber and the metal outlet.

12. Apparatus according to claim 4 wherein the slag outlet is located above the intended level of the metal and just below the slag level.

13. Apparatus according to claim 4 and having a slag barrier adjacent to the metal outlet.

14. Apparatus according to claim 4 and having a gas offtake at the outlet end of the slag separation chamber.

15. Apparatus according to claim 4 wherein the slag separation chamber is disposed substantially in line with the refining chamber.

16. Apparatus according to claim 4 wherein the slag separation chamber is disposed substantially parallel with the refining chamber.

17. Apparatus according to claim 4 including means for introducing fluxing materials into the refining chamber near the metal inlet and metal outlet.

References Cited

UNITED STATES PATENTS

| | | | |
|---|---|---|---|
| 2,557,651 | 6/1951 | Gilliland | 266—35 X |
| 2,639,984 | 5/1953 | Jordan | 75—46 |
| 2,649,366 | 8/1953 | Jordan | 266—35 X |
| 2,862,810 | 12/1958 | Alexandrovsky | 75—46 X |
| 3,022,157 | 2/1962 | Huntington | 75—46 X |
| 3,102,806 | 9/1963 | Zimmerley | 75—65 X |

J. SPENCER OVERHOLSER, *Primary Examiner.*

EUGENE MAR, *Assistant Examiner.*

U.S. Cl. X.R.

266—37